US009904930B2

(12) United States Patent
Ogawa

(10) Patent No.: US 9,904,930 B2
(45) Date of Patent: Feb. 27, 2018

(54) INTEGRATED AND COMPREHENSIVE ADVERTISING CAMPAIGN MANAGEMENT AND OPTIMIZATION

(75) Inventor: Stuart Ogawa, San Diego, CA (US)

(73) Assignee: Excalibur IP, LLC, New York, NY (US)

( * ) Notice: Subject to any disclaimer, the term of this patent is extended or adjusted under 35 U.S.C. 154(b) by 72 days.

(21) Appl. No.: 12/969,928

(22) Filed: Dec. 16, 2010

(65) Prior Publication Data
US 2012/0158485 A1 Jun. 21, 2012

(51) Int. Cl.
G06Q 30/00 (2012.01)
G06Q 30/02 (2012.01)

(52) U.S. Cl.
CPC ......... *G06Q 30/02* (2013.01); *G06Q 30/0242* (2013.01); *G06Q 30/0243* (2013.01)

(58) Field of Classification Search
USPC .......................................................... 705/14
See application file for complete search history.

(56) References Cited

U.S. PATENT DOCUMENTS

| 7,774,715 B1 | 8/2010 | Evans |
| 2003/0074252 A1 | 4/2003 | Chandler-Pepelnjak et al. |
| 2004/0172343 A1 | 9/2004 | Allibhoy et al. |
| 2006/0031107 A1 | 2/2006 | Aihara et al. |
| 2006/0230029 A1 | 10/2006 | Yan |
| 2006/0253327 A1 | 11/2006 | Morris et al. |
| 2007/0005419 A1 | 1/2007 | Horvitz et al. |
| 2007/0027754 A1* | 2/2007 | Collins .............. G06Q 10/0631 705/14.48 |
| 2007/0028263 A1 | 2/2007 | Collins |
| 2007/0239527 A1* | 10/2007 | Nazer .................... G06Q 30/02 705/14.46 |
| 2008/0059314 A1 | 3/2008 | Kirchoff et al. |
| 2008/0091537 A1 | 4/2008 | Miller et al. |
| 2008/0103897 A1 | 5/2008 | Flake et al. |
| 2008/0235089 A1 | 9/2008 | Weyer et al. |
| 2008/0255915 A1 | 10/2008 | Collins et al. |

(Continued)

FOREIGN PATENT DOCUMENTS

| CN | 101689273 A | 3/2010 |
| TW | 201011666 A | 3/2010 |

OTHER PUBLICATIONS

U.S. Appl. No. 12/970,446, filed Dec. 16, 2010, Stuart Ogawa.
(Continued)

*Primary Examiner* — Alvin L Brown
(74) *Attorney, Agent, or Firm* — Mauriel Kapouytian Woods LLP; Lana Akopyan; James Woods

(57) ABSTRACT

Techniques are provided for integrated and comprehensive advertising campaign management and optimization. Techniques are provided in which advertisers, including large-budget advertisers such as Chief Marketing Officers, can easily, efficiently and optimally define, manage and implement advertising budgets and campaigns, from high to granular levels, across a variety of online and offline channels. Such channels can include Web, mobile, social networking, etc., as well as traditional advertising channels such as TV, radio, etc. Techniques are provided, for example, in which advertisers, with a single click or selection, can cause implementation of a customized, optimized and comprehensive online and offline advertising campaign.

20 Claims, 12 Drawing Sheets

(56) References Cited

U.S. PATENT DOCUMENTS

| | | |
|---|---|---|
| 2008/0262964 A1 | 10/2008 | Bezos et al. |
| 2009/0063268 A1 | 3/2009 | Burgess et al. |
| 2009/0299817 A1 | 12/2009 | Fok et al. |
| 2010/0228582 A1 | 9/2010 | King et al. |
| 2011/0202404 A1 | 8/2011 | Van Der Riet |
| 2011/0231243 A1 | 9/2011 | Bhatia et al. |
| 2011/0238474 A1* | 9/2011 | Carr ................ G06Q 20/10 705/14.23 |
| 2011/0238486 A1* | 9/2011 | Liu et al. ............... 705/14.42 |
| 2011/0239246 A1* | 9/2011 | Woodward ......... G06Q 10/10 725/35 |
| 2012/0036009 A1* | 2/2012 | Aronowich et al. ..... 705/14.43 |
| 2012/0041792 A1 | 2/2012 | Priyadarshan et al. |
| 2012/0059707 A1* | 3/2012 | Goenka et al. ......... 705/14.41 |
| 2012/0066065 A1 | 3/2012 | Switzer |
| 2012/0084125 A1 | 4/2012 | Chan et al. |
| 2012/0084141 A1* | 4/2012 | Quinn et al. ........... 705/14.43 |
| 2012/0089455 A1 | 4/2012 | Belani et al. |
| 2012/0130813 A1 | 5/2012 | Hicken et al. |
| 2012/0253977 A1* | 10/2012 | Mesaros ........... G06Q 30/0222 705/26.41 |

OTHER PUBLICATIONS

U.S. Appl. No. 13/091,784, filed Apr. 21, 2011, Stuart Ogawa.
U.S. Appl. No. 13/092,267, filed Apr. 22, 2011, Stuart Ogawa.
U.S. Appl. No. 13/220,474, filed Aug. 29, 2011, Stuart Ogawa.
U.S. Appl. No. 12/970,593, filed Dec. 16, 2010, Stuart Ogawa.
U.S. Appl. No. 13/283,091, filed Oct. 27, 2011, Ogawa.
U.S. Appl. No. 13/595,303, filed Aug. 27, 2012, Ogawa.
International Search Report and Written Opinion issued in International Application No. PCT/US2011/062252 dated Jun. 27, 2012.
International Search Report and Written Opinion issued in International Patent Application No. PCT/US2012/049957 dated Jan. 31, 2013.
Office Action issued in Taiwanese Patent Application No. 100143266 dated Aug. 20, 2014.
Office Action issued in Taiwanese Patent Application No. 101129675 dated Aug. 15, 2014.

* cited by examiner

INTEGRATED AND COMPREHENSIVE ADVERTISING CAMPAIGN MANAGEMENT AND OPTIMIZATION

BACKGROUND

Spending advertising dollars, from the advertiser executive perspective, can be a difficult and challenging problem. Advertiser and agency executives spend a large amount of time strategizing, budgeting, spending and measuring aggregate advertising dollar use and effectiveness. Chief Marketing Officers, for example, may have to rely upon a disparate mix of personal experience, in-house and third party data results and recommendations, and forecasting models, to name a few methods, in order to manage annual and multi-year advertising budgets and effectiveness. This process is not efficient and demonstrates advertiser inability to sufficiently obtain insights and to incrementally improve strategies based on data-driven insights. This problem is compounded by the huge amounts of marketing data from an increasing number of new direct and indirect online advertising channels, such as social networks and mobile channels, which increases the complexity and difficulty of obtaining meaningful insights.

Generally, managers of advertising campaigns, including large-budget, online and offline, multi-channel campaigns, lack, for example, optimal tools to harness information, inform them and allow them to efficiently and effectively accomplish their tasks, from high level tasks such as distribution and allocation of planned spend across various channels, to granular and detailed tasks such as particular advertising campaign allocations, spend, purchasing, adjustments, etc.

There is a need for improved techniques relating to advertising campaign management and optimization.

SUMMARY

Some embodiments of the invention provide systems and methods for integrated and comprehensive advertising campaign management and optimization. Techniques are provided in which advertisers, including large-budget advertisers such as Chief Marketing Officers, can easily, efficiently and optimally define, manage, implement and refine advertising budgets and campaigns, from high to granular levels, across a variety of online and offline channels. Such channels can include Web, mobile, social networking, etc., as well as traditional advertising channels such as TV, radio, etc. Techniques are provided, for example, in which advertisers, with a single click or selection, can cause formulation and implementation of a customized, optimized and comprehensive online and offline advertising campaign.

In some embodiments, techniques are provided in which advertiser target customer profile templates, publisher audience segment templates, and matching templates are generated, modified, stored, selected and utilized to efficiently optimize advertising campaigns, including inventory matching, leading to increasing campaign effectiveness, reduced and more effectively spent campaign management time, and increased ROI.

In some embodiments, techniques are provided that include allo ing advertisers or publishers to simulate implementation of an advertising campaign, which can include selecting and utilizing target customer, audience segment, and matching profiles. Tools are provided for viewing outcomes and results, which can aid and inform advertising campaign planning and purchasing.

While the invention is described with reference to the above drawings, the drawings are intended to be illustrative, and the invention contemplates other embodiments within the spirit of the invention.

DETAILED DESCRIPTION

Figure 1:
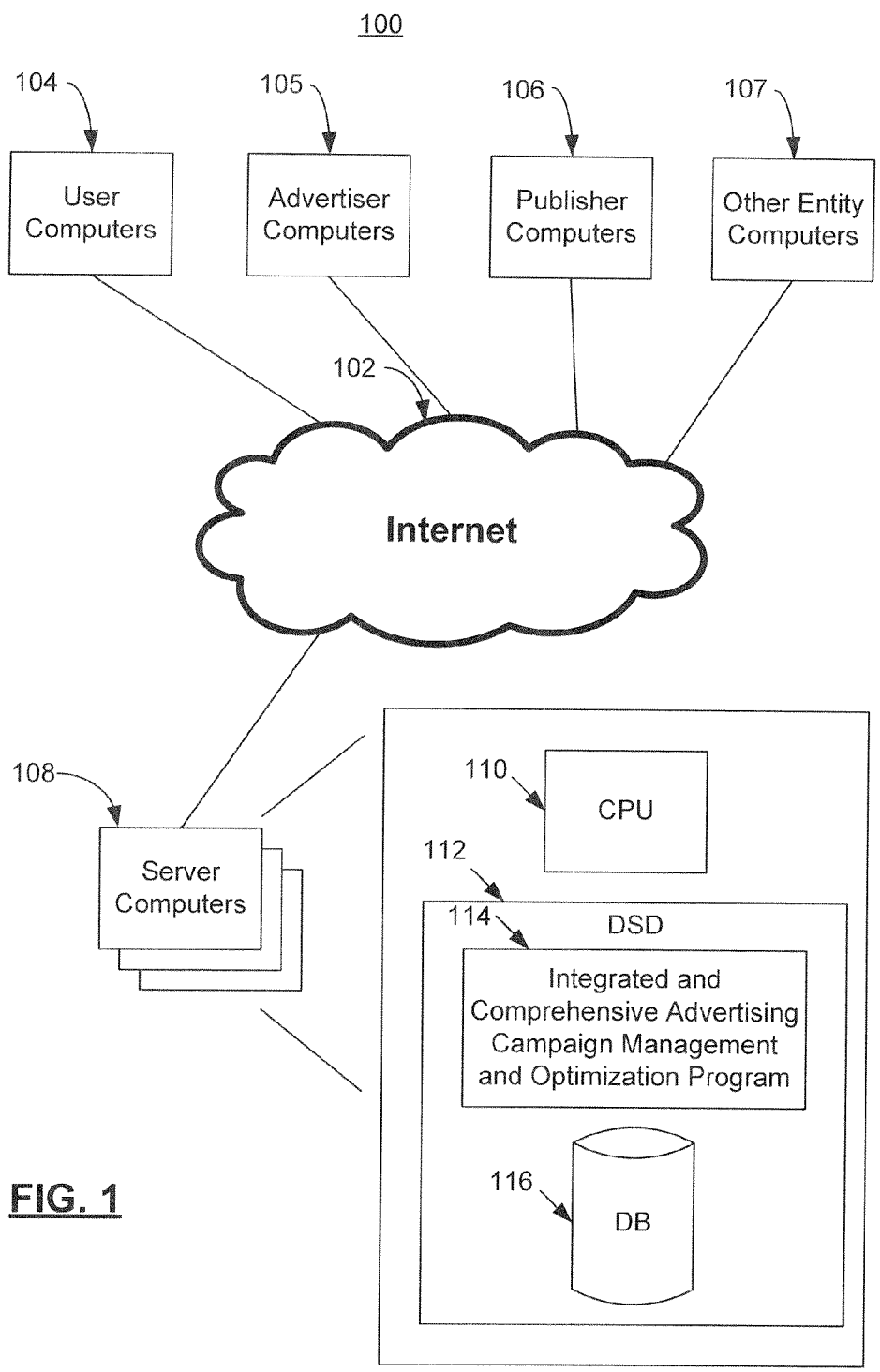
FIG. 1 is a distributed computer system according to one embodiment of the invention.

FIG. 1 is a distributed computer system 100 according to one embodiment of the invention. Although many configurations are possible, the system 100 as depicted includes user computers 104, advertiser computers 105, publisher computers 106, other entity computers 107, and server computers 108, all coupled or able to be coupled to the Internet 102. Although the Internet 102 is depicted, the invention contemplates other embodiments in which the Internet is not included, as well as embodiments in ich other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104-108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and Integrated and Comprehensive Advertising Campaign Management Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
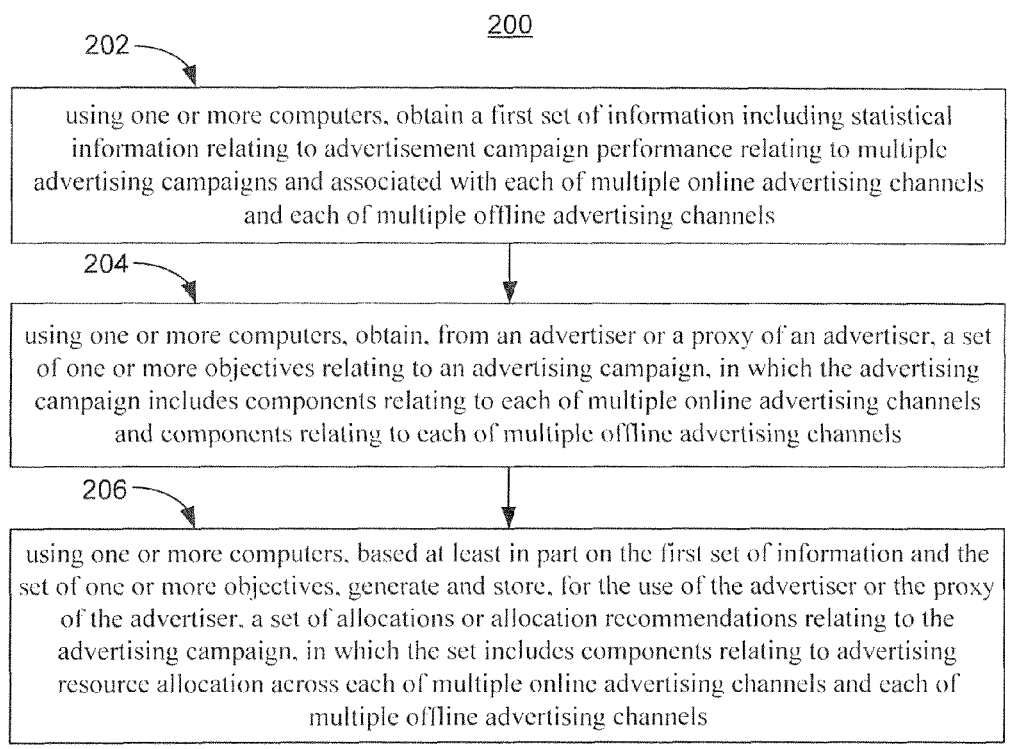
FIG. 2 is a flow diagram illustrating a method according to one embodiment of the invention.

FIG. 2 is a flow diagram illustrating a method 200 according to one embodiment of the invention. At step 202, using one or more computers, a first set of information is obtained, including statistical information relating to advertisement campaign performance relating to multiple advertising campaigns and associated with each of multiple online advertising channels and each of multiple offline advertising channels.

At step 204, using one or more computers, a set of one or more objectives is obtained, from an advertiser or a proxy of an advertiser, relating to an advertising campaign. The advertising campaign includes components relating to each of multiple online advertising channels and components relating to each of multiple offline advertising channels.

At step 206, using one or more computers, based at least in part on the first set of information and the set of one or more objectives, a set of allocations or allocation recommendations relating to the advertising campaign is generated and stored, for the use of the advertiser or the proxy of the advertiser. The set includes components relating to advertising resource allocation across each of multiple online advertising channels and each of multiple offline advertising channels.

Figure 3:
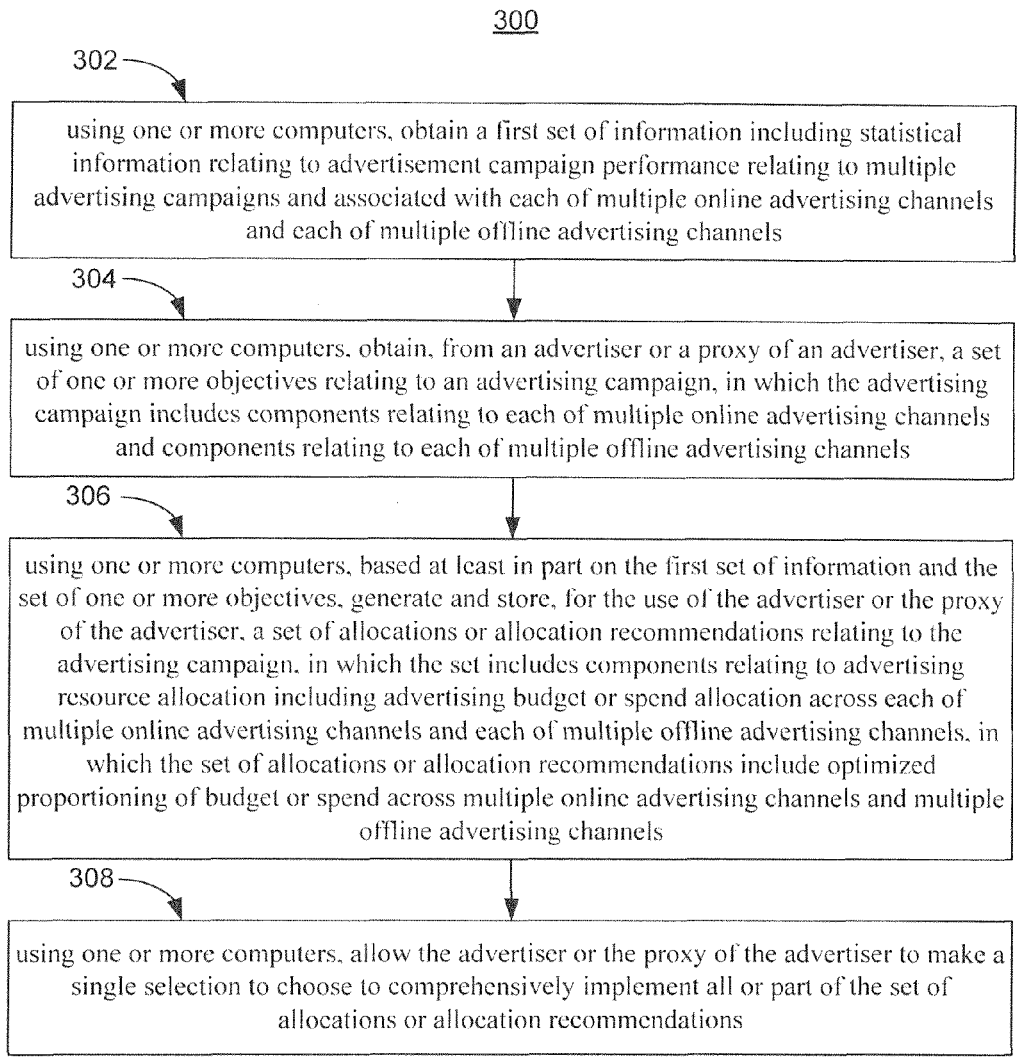
FIG. 3 is a flow diagram illustrating a method according to one embodiment of the invention.

FIG. 3 is a flow diagram illustrating a method 300 according to one embodiment of the invention. At step 302, using one or more computers, a first set of information is obtained, including statistical information relating to advertisement campaign performance relating to multiple advertising campaigns and associated with each of multiple online advertising channels and each of multiple offline advertising channels.

At step 304, using one or more computers, a set of one or more objectives is obtained, from an advertiser or a proxy of an advertiser, relating to an advertising campaign. The advertising campaign includes components relating to each of multiple online advertising channels and components relating to each of multiple offline advertising channels.

At step 306, using one or more computers, based at least in part on the first set of information and the set of one or more objectives, a set of allocations or allocation recommendations are generated and stored, for the use of the advertiser or the proxy of the advertiser, relating to the advertising campaign. The set includes components relating to advertising resource allocation including advertising budget or spend allocation across each of multiple online advertising channels and each of multiple offline advertising channels. Furthermore, the set of allocations or allocation recommendations include optimized proportioning of budget or spend across multiple online advertising channels and multiple offline advertising channels.

At step 308, using one or more computers, the advertiser or the proxy of the advertiser is allowed or provide an option to make a single selection to choose to comprehensively implement all or part of the set of allocations or allocation recommendations.

Figure 4:
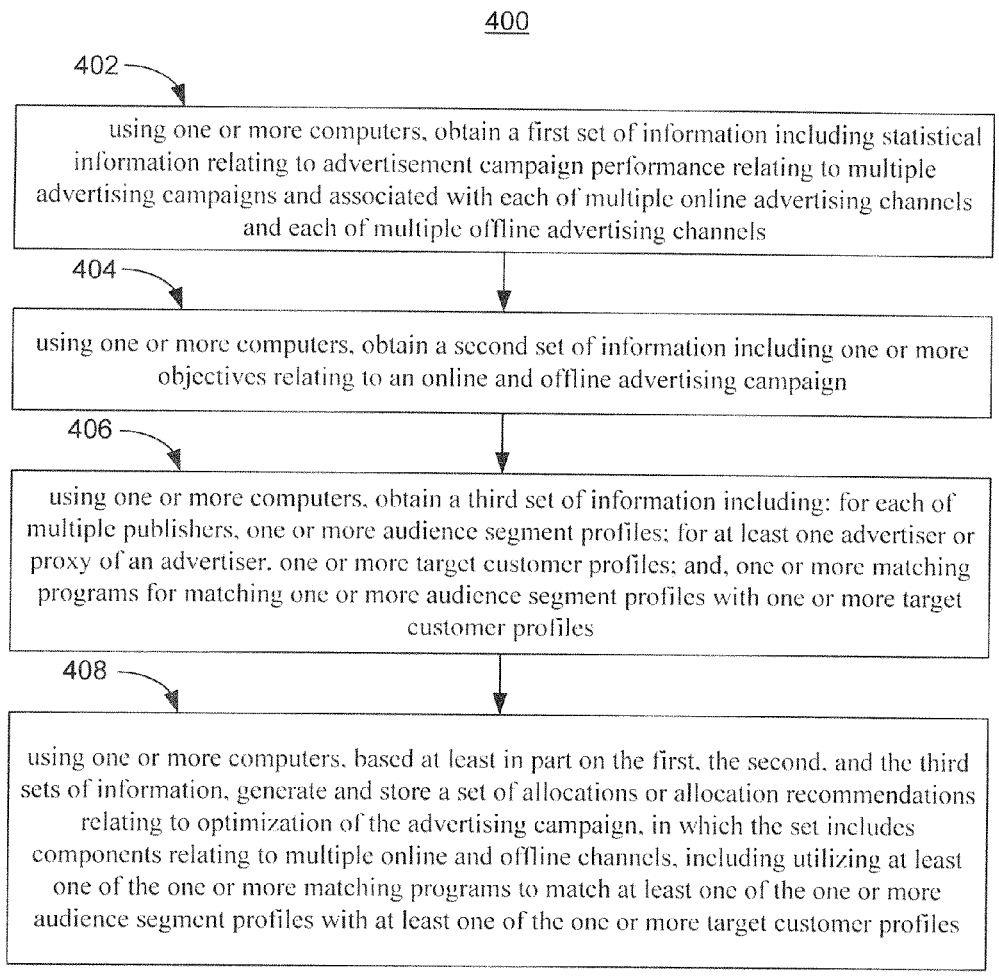
FIG. 4 is a flow diagram illustrating a method according to one embodiment of the invention.

FIG. 4 is a flow diagram illustrating a method 400 according to one embodiment of the invention. At step 402, using one or more computers, a first set of information is obtained, including statistical information relating to advertisement campaign performance relating to multiple advertising campaigns and associated with each of multiple online advertising channels and each of multiple offline advertising channels.

At step 404, using one or more computers, a second set of information is obtained, including one or more objectives relating to an online and offline advertising campaign.

At step 406, using one or more computers, a third at of information is obtained, including: for each of multiple publishers, one or more audience segment profiles; for at least one advertiser or proxy of an advertiser, one or more target customer profiles; and, one or more matching programs for matching one or more audience segment profiles with one or more target customer profiles.

At step 408, using one or more computers, based a least in part on the first, the second, and the third sets of information, a set of allocations or allocation recommendations are generated and stored, relating to optimization of the advertising campaign. The set includes components relating to multiple online and offline channels, including utilizing at least one of the one or more matching programs to match at least one of the one or more audience segment profiles with at least one of the one or more target customer profiles.

Figure 5:
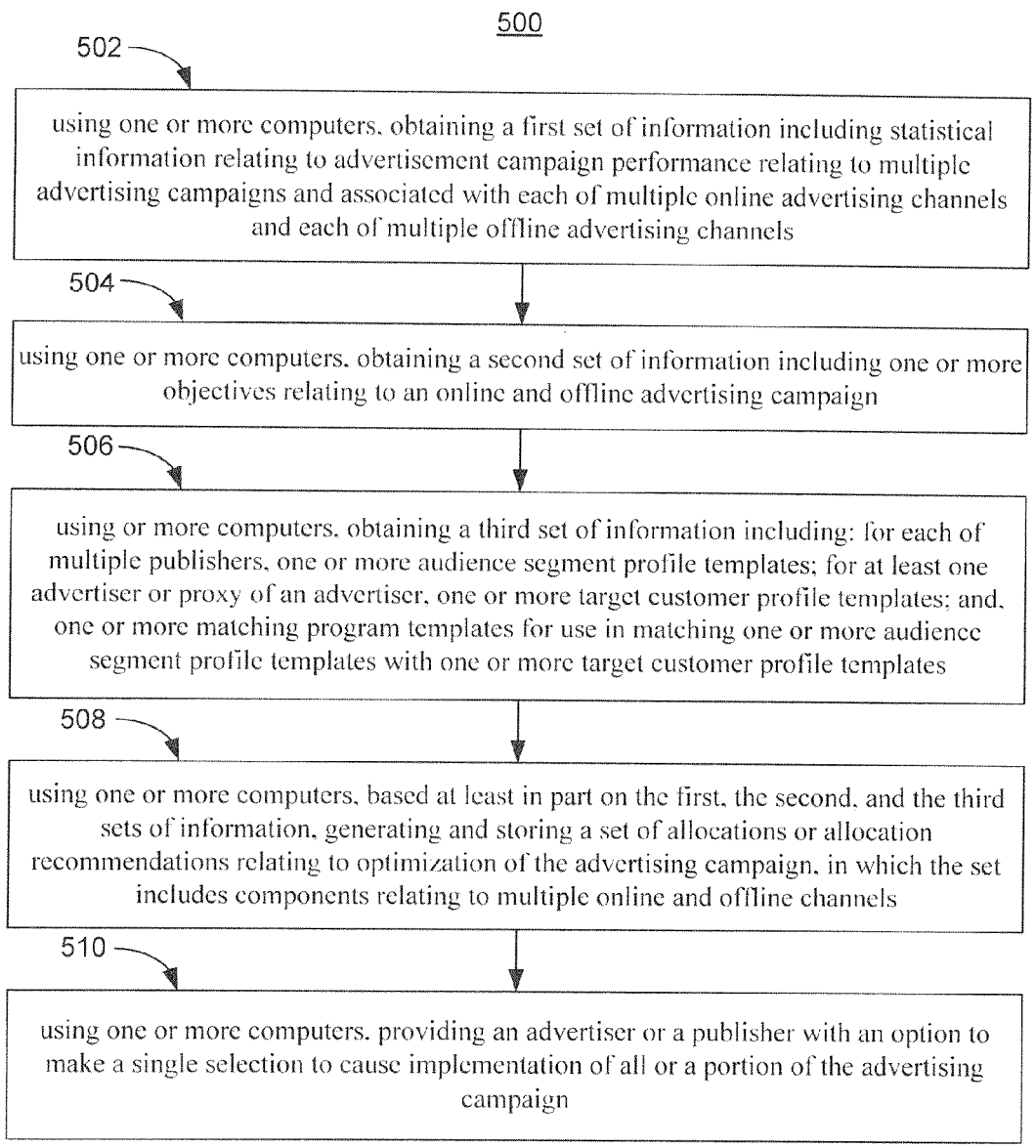
FIG. 5 is a flow diagram illustrating a method according to one embodiment of the invention.

FIG. 5 is a flow diagram illustrating a method 500 according to one embodiment of the invention. At step 502, using one or more computers, a first set of information is obtained, including statistical information relating to advertisement campaign performance relating to multiple advertising campaigns and associated with each of multiple online advertising channels and each of multiple offline advertising channels.

At step 504, using one or more computers, a second set of information is obtained, including one or more objectives relating to an online and offline advertising campaign.

At step 506, using one or more computers, a third set of information is obtained, including: for each of multiple publishers, one or more audience segment profile templates; for at least one advertiser or proxy of an advertiser, one or more target customer profile templates; and, one or more matching program templates for use in matching one or more audience segment profile templates with one or more target customer profile templates.

At step 508, using one or more computers, based at least in part on the first, the second, and the third sets of information, a set of allocations or allocation recommendations is generated and stored, relating to optimization of the advertising campaign, in which the set includes components relating to multiple online and offline channels.

At step 510, using one or more computers, an advertiser or a publisher is provided with an option to make a single selection to cause implementation of all or a portion of the advertising campaign.

Figure 6:
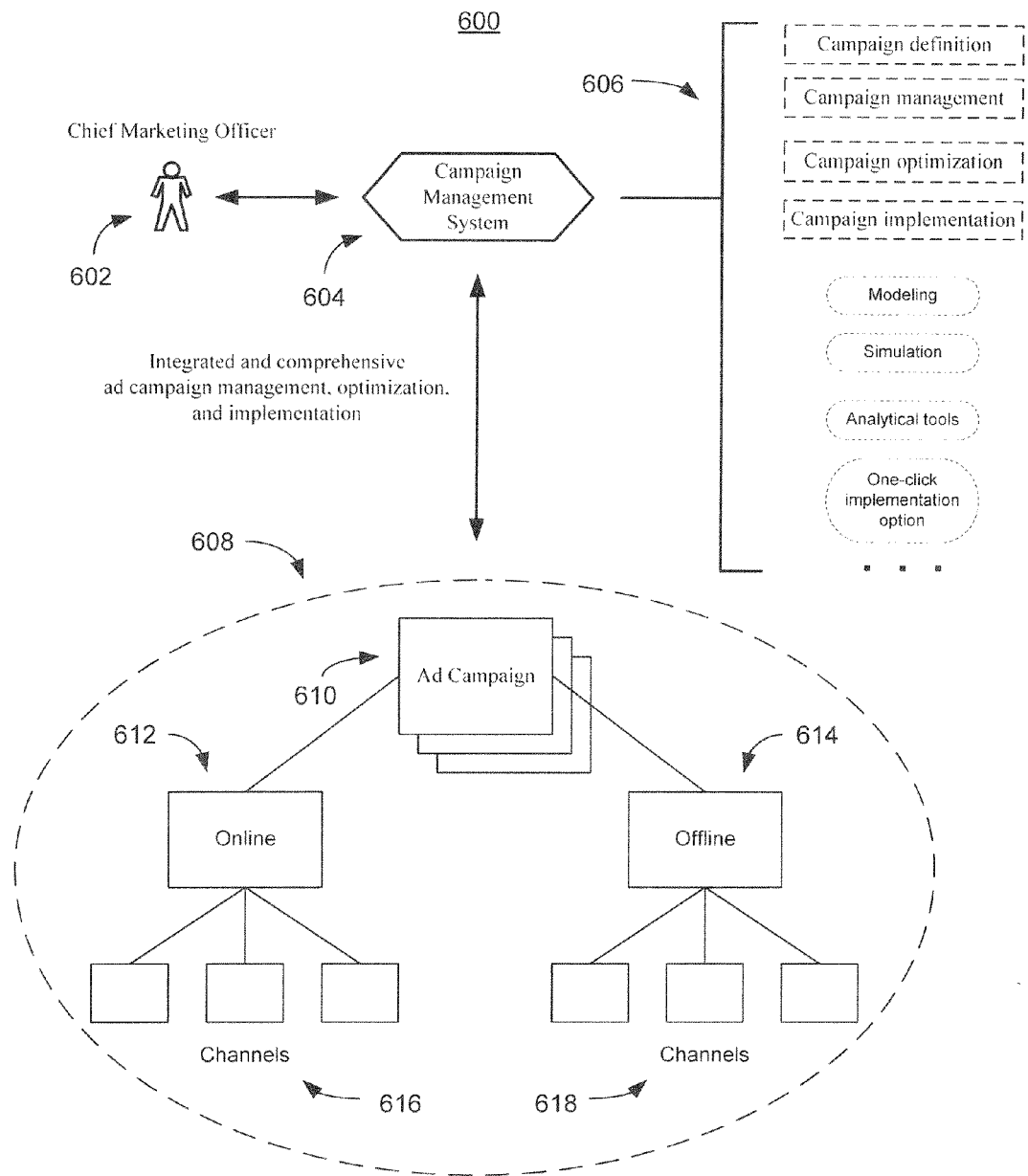
FIG. 6 is a block diagram illustrating one embodiment of the invention.

FIG. 6 is a block diagram 600 illustrating one embodiment of the invention. As depicted, as advertiser, which may be a large budget advertiser such as a Chief Marketing Officer 602 has access to a Campaign Management System 604 according to one embodiment of the invention.

While embodiments of the invention are often described reference to a Chief Marketing Officer, it is to be understood that the invention contemplates advertisers broadly and generally, including not only Chief Marketing Officers, but also any of various advertisers, agents of advertisers, proxies of advertisers, etc., which can include marketers, staff, employees, associated entities, etc.

The Campaign Management System 604 may include many different aspects, functions, modules, etc. As depicted, these may include components 606 relating to campaign definition, campaign management, campaign optimization, campaign implementation, modeling, simulation, analytical tools, options such as a one-click or one-selection implementation option, etc.

The Campaign Management System 604 may be used by the Chief Marketing Officer 602, for example, in connection with one or more advertising campaigns, such as the depicted advertising campaign 608, which includes an online component 612 with multiple channel components 616 as well as an offline component 614 with multiple channel components 618. It is to be noted that the advertising campaign 608 can contain multiple other campaigns or subcampaigns, such as hierarchically or family-related campaigns. Additionally, various particular components of the advertising campaign 608, including the online component 612, offline component 614, and various channel components 618, can also include hierarchically or family-related components or sub-components.

Figure 7:
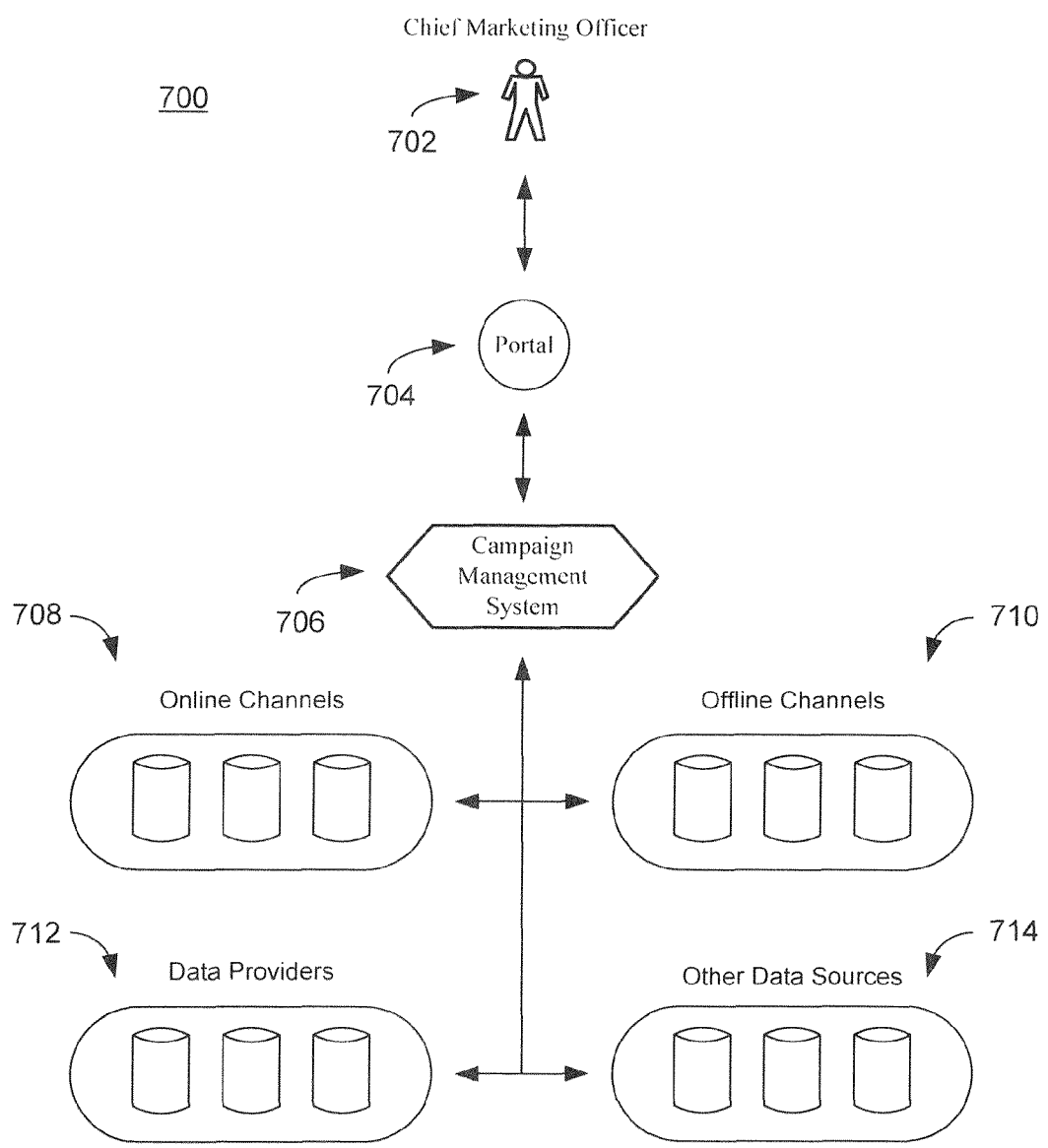
FIG. 7 is a block diagram illustrating one embodiment of the invention.

FIG. 7 is a block diagram 700 illustrating one embodiment of the invention. As depicted, a Chief Marketing Officer 702 obtains access via a portal 704, such as a Web-based portal, to a Campaign Management System 706 according to one embodiment of the invention.

The Campaign Management System 706 accesses information from a variety of distributed data sources and databases, and may also be in two way communication with such data sources. These can include, for example, information from various online channels 708, offline channels 710, data providers 712, and various other sources 714. Information from the data sources is used in carrying out various Campaign Management System 706 functions.

Figure 8:
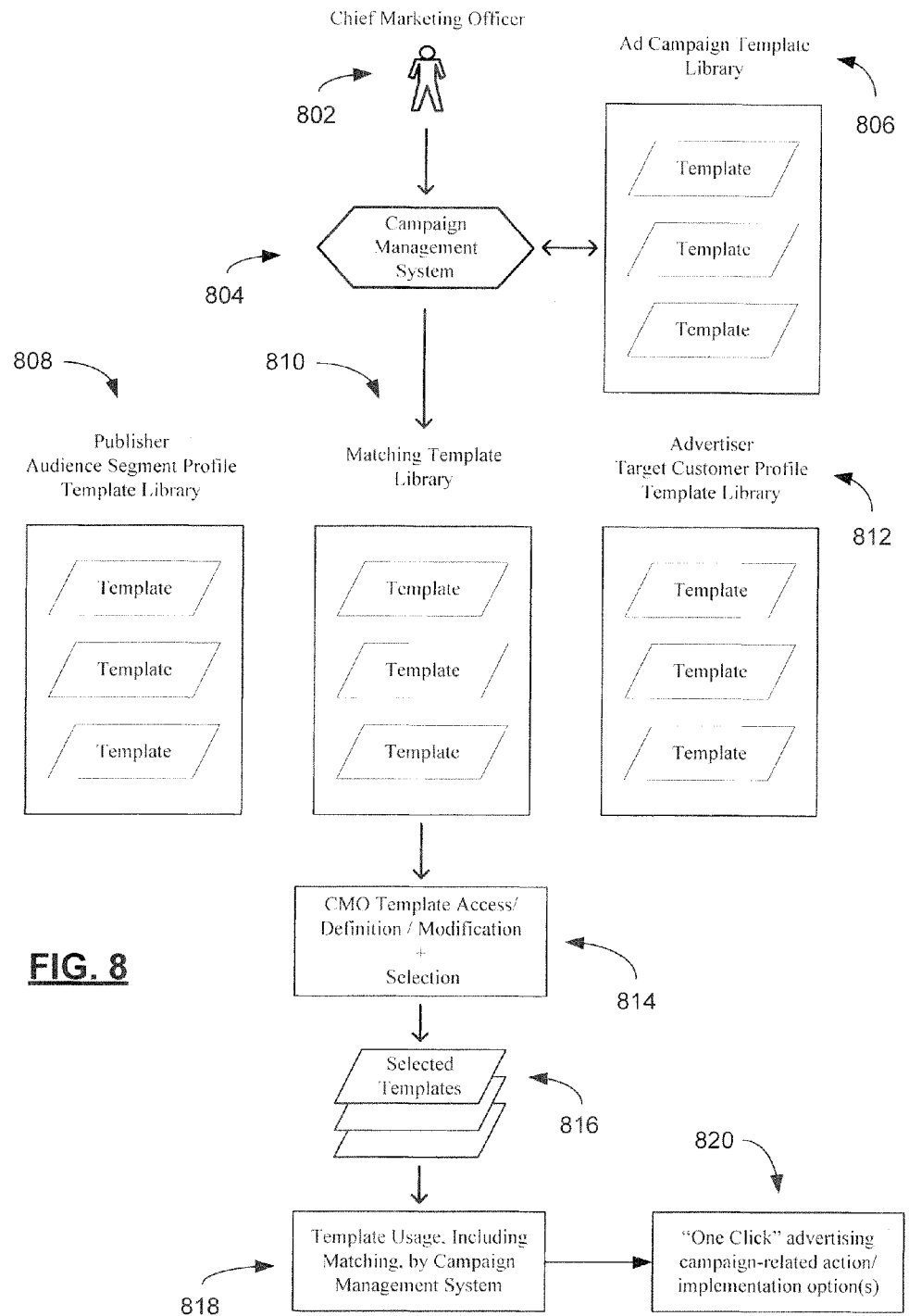
FIG. 8 is a flow diagram illustrating a method according to one embodiment of the invention.

FIG. 8 is a flow diagram illustrating a method 800 according to one embodiment of the invention, including use of templates. In some embodiments, templates provide a convenient, flexible, efficient tool for helping achieving customized, precise, high-definition and granular functionality for use of an advertiser 802, such as a Chief Marketing Officer, for example. This can include, for example, matching of advertiser customer profiles with publisher audience segment profiles. A customer, as the term is used herein, broadly includes any targeted user, whether or not a purchaser or intended purchaser. Generally, templates can include data structures as well as the information stored within. Templates can include additional features such as models, applications, programs, etc. Use the term is used herein, a template can include data structures with or without stored, identified, particular or customized information. Templates can contain information useful in various campaign management, optimization and implementation functionality. A very simple example of a template could include a form with various pre-defined records or fields for storing particular advertiser-associated information, which may be accomplished or facilitated by or with use of a Campaign Management System 804. Ho ich more sophisticated templates are contemplated by embodiments of the invention.

Also depicted are an advertising campaign template library 806, a library 808 of publisher audience segment profile templates, a library 812 of advertiser targeted customer (or other targeted user) profile templates, and a library 810 of matching templates. As represented by step 814, the advertiser 802 selects (or defines or customizes and explicitly or implicitly selects) templates 816 to be utilized, which can include one or more templates from, or derived from, each of the libraries 808, 810, 812, and can also include other selected templates, such as one or more advertising campaign templates, for example.

Step 818 represents use of templates, such as selected templates, in various ways with or by the Campaign Management System 804. This can include, for example, matching audience segment profile templates with targeted customer profile templates using matching templates, to help optimally inform advertising planning, purchasing, etc.

Step 820 represents "One Click" advertising campaign-related action/implementation option(s), which may be made available to the advertiser in some embodiments of the invention. As also described elsewhere herein, in some embodiments, advertisers or publishers are provided with options to take action related to one or more advertising campaigns, such as to implement all or a portion or aspect of a campaign, such as by a single click or selection. For example, the advertiser may be provided with one or more suggested or recommended campaign implementation options, which may include, for example, a comprehensive multichannel online and offline advertising campaign, which may include bidding or purchasing, or which may be viewed or modified by the advertiser before being caused to be implemented. In various embodiments, such a campaign or portion of a campaign may be implemented immediately or over time, and may or may not be subject to adjustment or modification over time. In some embodiments, such options may be related to or based on one or more simulated advertising campaigns or campaign portions. Furthermore, in some embodiments, the advertiser may use various analytical and visualization tools, including graphs, charts, summaries, analytical results, etc., and a one-click action or implementation option may be provided in connection therewith or otherwise.

In some embodiments of the invention, systems are provided that portfolio manage all online and offline advertising information, from the advertiser and agency business perspective, and that use a collection of methods including, but not limited to, simulations, predictive and causal forecast modeling, actionable insight software engines, recommendation engines, data mining, visual analytics, text analytics, and data warehouses, for example, to optimize overall business advertising goals, objectives, and models.

Some embodiments recognize that previous systems and methods are unable to provide or sufficiently provide meaningful insights and propose or implement actions for an advertising portfolio (from an advertiser perspective) consisting of both traditional offline advertising methods and online advertising methods. For example, previous solutions are typically fragmented, labor intensive and semi-automated processing intensive, and do not provide or sufficiently provide timely insights and actionable information.

Some embodiments of the invention, for example, enable advertisers to increase topline revenue by spending substantially more time understanding advertising insights and optimizing actions, instead of spending too much time using manual and semi-automated processes to turn data into inconsistent information with little to no insights.

Some embodiments provide systems and collections of methods using software, databases, and modern communication methods in providing advertisers with a holistic, data driven advertising picture and that operationalizes advertising strategies, insights, recommendations, incremental improvement changes, dollar spend recommendations, portfolio advertising management, and reporting, among other things. Systems are provided that aggregate data from a variety of sources and use methods to translate the data into meaningful and insightful business information, to present the information along with recommendations, to facilitate advertising purchases, and to provide holistic and insightful active advertising management, among other things. The aggregate of these methods can collectively apply to both traditional offline advertising methods and to the latest online advertising methods.

Some embodiments provide systems and methods for the advertising sector that can be viewed as is conceptually incorporating approaches that, while novel and non-obvious over, can be analogized in some ways with computerized automated investment trading systems, such as Goldman Sachs' trading systems, and global travel ticketing systems, such as Sabre. Automated trading systems, for example, analytically sift through mountains of data and take manual, semi-automated, and automated trade actions. Systems such as the Sabre travel system tie together the global inventory of airlines, hotels, and rental cars.

Some embodiments can further include techniques that, while novel and non-obvious, can be analogized in some ways with methods from other industries, such as Amazon's book recommendation analytic engine and Netflix's Cinematic movie recommendation engine, applying combined techniques, among other things, to the advertising buyer space and providing a world class system for global advertisers.

Some embodiments include the following, for example. An advertiser selects an industry advertising campaign template, modifies an existing campaign template or creates new campaign template. Using various provided applications, graphical user interfaces, etc., the advertiser may input variables, such as advertising goals, keywords, KPIs, market segments, budgets, historical data, results, etc., into, and adding to, the template. The advertiser may run advertising simulations using statistics, such as Monte Carlo technique-based simulations, for example. The advertiser may review simulation results, including channel recommendations, KPI simulation results, proposed changes, proposed advertising optimization recommendations, etc. The advertiser may review real-time advertising inventory availability and cost, and may compare them to simulations. Furthermore, the advertiser may make a single selection, such as, for a particular example, selecting "One Click Campaign" to purchase advertising in online and traditional channels in one step.

Furthermore, some embodiments provide a variety of other functionality or features. For example, in some embodiments, an advertiser may monitor and manage a portfolio of overall or segment campaigns. In some embodiments, an advertiser may enable application recommendation analytics to provide insights, or may enable automated application analytic campaign changes and optimizations in order to attain KPIs and goals, for example. In some embodiments, an advertiser may enable application of analytic competitive recommendations, such as, for a particular example, "businesses targeting this segment and audience also selected X online property and Y traditional channel", etc. Furthermore, in some embodiments, an advertiser can run visual analytics such as real time heat maps to identify and track successful campaigns and campaigns where business actions need changes and corrections, for example.

As described above, embodiments of the invention contemplate use and for advertising campaigns including components relating to various online, including digital, channels as well as various offline channels. Online advertising channels can include, for example, various types of Web portal properties such as news, sports, etc., virtual reality and virtual worlds, gaming, search engines such as Google, Baidu, etc., social networks such as Linkedin, Twitter, Facebook etc., mobile channels such as provided by Admob, Apple, Kindle including ebooks, Amazon, etc. Of course, there are many other online channels that are contemplated by embodiments of the invention.

Embodiments of the invention also contemplate a variety of offline channels. These can include, for example, traditional channels such as physical advertising, television, cable, satellite, radio, print such as newspaper, magazine, consortium, etc. Offline channels can include, for example, sports-related and other event-related or activity-related advertising, such as endorsement, outdoor proximity advertising at sports arenas, sports events, etc. Of course, there are many other online channels that are contemplated by embodiments of the invention.

Some embodiments of the invention include techniques that address advertiser (including agency) interests, and can include matching advertiser campaigns to target audiences, for example.

Some embodiments of the invention provide techniques, methods and systems that enable an advertiser to self-serve, control, compute and match an advertiser's ideal, high definition customer profile to a publisher's high definition audience target profile. For example, techniques are provided that enable advertisers to define and create N number of high definition target customer profile. Techniques are further provided that enable advertisers to select and or modify a publisher's high definition audience segment profile from a library of N audience segment profiles. Techniques are also provided that enable the advertiser to select and or modify a publisher's matching programs, from a library of publisher's matching programs, which can include, for example, analytics, in order to compute match the advertiser's high definition target customer profile to the publishers high definition target audience profile (or profile template). In some embodiments, this results in an optimized or near-perfect advertiser ideal customer to audience match. This can increase the advertiser's achievement of goals, such as revenue or brand engagement. For example, provided techniques can lead as to higher performance measures such as higher conversion rates, increases advertising campaign ROI, increases advertiser end-to-end advertising campaign control, or increased brand engagement. Furthermore, provided techniques can reduce advertising campaign expenditures by reducing targeting of incorrect or non-optimized audiences.

Some embodiments of the invention recognize that a Chief Marketing Officer ideal goal can be to create the perfect advertising campaign by defining an ideal customer profile and surgically targeting only audiences that match ideal customers. This perfect, albeit utopian, state of alignment increases advertiser's revenue, increases advertising campaign ROI, and reduces advertising campaign expenses on campaigns targeting the incorrect audiences, as the alignment gap decreases.

Some embodiments further include a recognition that, despite the technology that exists today, publishers and value-add service providers in the online and offline advertising ecosystem have not materially or sufficiently decreased the aforementioned alignment gap and have not materially or sufficiently moved toward the utopia alignment state for Chief Marketing Officers. Amplifying the misalignment and further increasing the alignment complexity is the increased amount of data, the increased number of new media channels (mobile, social networks, etc.), and the lack of integrated systems and methods to compute and present actionable advertising campaign options directly in the hands of Chief Marketing Officers. Some embodiments of the invention provide techniques that help close the alignment gap between advertisers ideal target customers and online/offline publishers' target audiences.

Some embodiments of the invention provide techniques that provide advertisers with a portal into all online and offline advertising channels and inventory. This can allow advertisers to avoid inefficient spending of time using previous online methods and calling traditional advertisers to conduct an overarching global campaign, and can allow advertisers to more quickly launch campaigns.

Some embodiments include providing advertisers with pricing information, such as pricing of advertising inventory. Such techniques can allow easier and faster pricing of an entire campaign, regardless of the number of online and offline advertising channels, to support an overarching campaign, decreasing internal time spent per campaign.

Some embodiments provide advertisers with the ability to create and templatize global advertising campaigns. This can allow easier launching of N number of campaigns per year without people spending time recreating and re-launching online and offline campaigns, reducing labor costs associated with online and offline campaigns.

Furthermore, some embodiments include use of templates that may be termed SuperAdCampaign (SAC) templates, which can be relational advertising campaign templates. In some embodiments, SACs can be aggregated, structured, and organized to facilitate multi-faceted or multi-tiered hierarchies, such as parent/children campaign structures, for example, that can drive end-to-end macro-to-micro advertising campaigns. For example, a SAC campaign template can have a global parent campaign advertising campaign message and children advertising campaign templates tailored to local regional needs and requirements, yet children campaigns are related to the parent and reinforce and easily manage the overall parent advertising campaign template. Algorithms and analytics can be imbedded into the SAC template and applied to one or more specific meta-characteristics using N number of variables, such as time, in order to reposition advertising campaigns in real time and to account for changes, such as advertisement effectiveness decay, as one example. Algorithms and analytics can be applied to the SAC template using N number of variables, such as real-time geo meta-data or causal forecasting, to reposition advertising campaigns, for example.

Some embodiments provide advertisers with the ability to create highly defined targeted customer templates. This can allow easier creation and templatization of a 360 degree view of target customers in high definition. Such techniques can use, for example, N number of variables, algorithms, user defined characteristics, keywords, etc., to characterize or profile ideal or targeted customers.

Some embodiments of the invention provide for optimal and granular use of user, customer, and audience information while guarding privacy.

Some embodiments provide advertisers with the ability to integrate input variables from their own customer database into an ideal or targeted customer or customer segment template. Furthermore, some embodiments provide advertisers with the ability to incorporate input variables from their advertising agencies, third party data providers and marketeers (e.g. Nielsen), etc. into their customer template. Furthermore, some embodiments provide advertisers with the ability to incorporate algorithms and analytics, such as machine learning, into their customer segment template. These various techniques can sharpen and focus ideal customer targeting.

Some embodiments provide advertisers with the ability to look at a publisher's library of audience segments to better view, control, and launch target audiences. This can provide advertisers with a variety of target audience campaign options that they might not have thought about before, and, generally, the more target audience segment options, the better the associated campaign results.

Some embodiments provide advertisers with one or more search engines, such as a search engine associated with template libraries, including audience segment profile templates. Such search engines can be used, for example, in finding audience segments in the publisher's audience segment library. Such techniques can provide the advertiser with the ability to search for and quickly identify the most relevant target audience segment options, for example, among other things.

Some embodiments enable advertisers to create and modify publisher audience segment profile templates, such as to order to sharpen target audience segments. This can enable an advertiser to further tune and align the advertiser's target customer profile or profile template to the publisher's audience segment profile or profile templates, for example.

Some embodiments enable advertisers to create, view, and modify publisher matching programs from a library of publisher matching programs. This can enable the advertiser to create and modify publishers' matching programs to further optimize the alignment between the advertiser's target customer profile template and the publishers audience segment profile template, for example.

Some embodiments provide advertisers with the ability to incorporate or modify algorithms and analytics in publisher matching templates. This can, for example, include or allow use of machine learning to automatically sharpen and focus matching of target customer profile templates with audience segment profile templates, giving more and better control to the advertiser, for example.

Some embodiments enable a publisher to scalably create and easily launch N number of high definition audience segment profile templates. This can result in increased publisher revenue by enabling advertisers to launch N number of campaigns per year globally while minimizing labor costs.

Some embodiments enable a publisher to create a scalable ecosystem that connects publishers, advertisers, such as Global 2000 advertisers, and other ecosystem online and offline value-added services and providers into a single platform. This can increase publisher revenue by creating a system that allows an advertiser to see, view, and book a global campaign anywhere, anytime. Furthermore, in some embodiments, service campaign analytics can be sold to advertisers.

Some embodiments enable a publisher to connect all of the online and offline advertisers to make it easier for advertisers to one-stop purchase global campaigns. This can increase publisher revenue by making it easier and faster for the advertiser to spend every advertising campaign dollar in their budget. The publisher may participate and monetize a part of every dollar spent by Global 2000 advertising campaigns, for example.

Some embodiments enable publishers to create sophisticated, analytics-driven options for advertisers. As a particular example, a note or recommendation may provided, such as "people who created this campaign also purchased this audience segment". Such techniques can increase publisher revenue via self-serve and or analytic driven offers or next-best offers, for instance.

Figure 9:
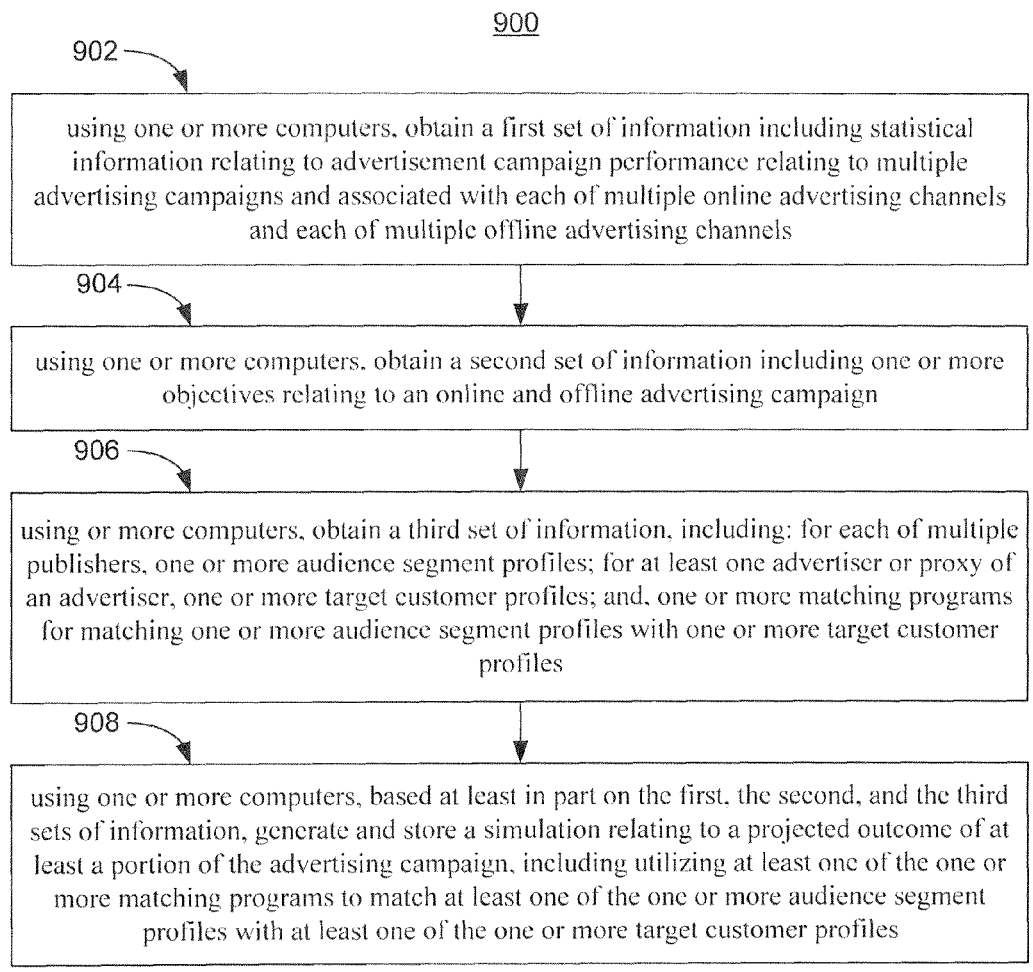
FIG. 9 is a flow diagram illustrating a method according to one embodiment of the invention.

FIG. 9 is a flow diagram illustrating a method 900 according to one embodiment of the invention. At step 902, using one or more computers, a first set of information is obtained, including statistical information relating to advertisement campaign performance relating to multiple advertising campaigns and associated with each of multiple online advertising channels and each of multiple offline advertising channels.

At step 904, using one or more computers, a second set of information is obtained, including one or more objectives relating to an online and offline advertising campaign.

At step 906, using or more computers, a third set of information is obtained, including: for each of multiple publishers, one or more audience segment profiles: for at least one advertiser or proxy of an advertiser, one or more target customer profiles; and, one or more matching programs for matching one or more audience segment profiles with one or more target customer profiles.

At step 908, using one or more computers, based at least in part on the first, the second, and the third sets of information, a simulation is generated and stored, relating to a projected outcome of at least a portion of the advertising campaign, including utilizing at least one of the one or more matching programs to match at least one of the one or more audience segment profiles with at least one of the one or more target customer profiles.

Figure 10:
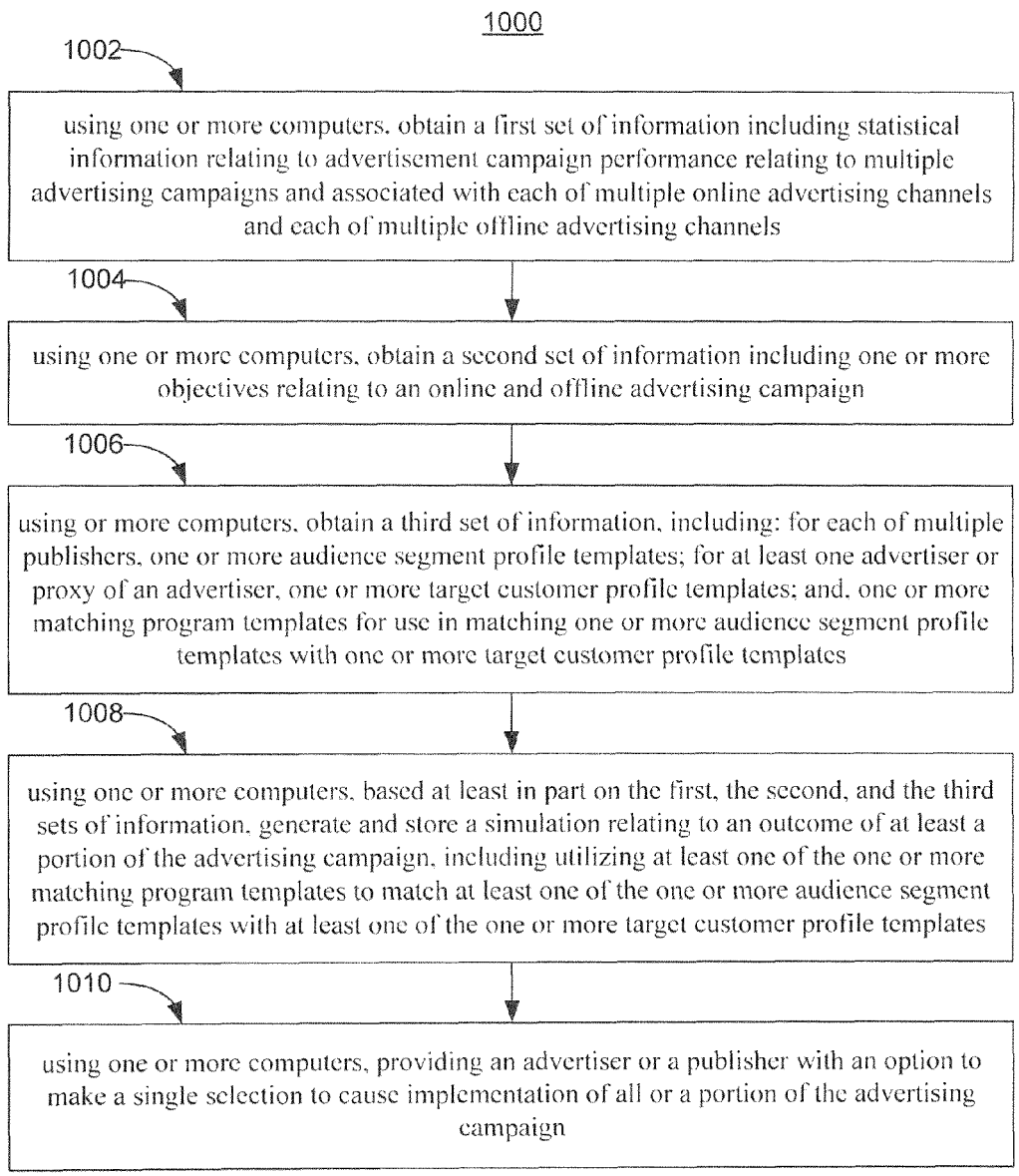
FIG. 10 is a flow diagram illustrating a method according to one embodiment of the invention.

FIG. 10 is a flow diagram illustrating a method 1000 according to one embodiment of the invention. Steps 1002 and 1004 are similar to step 902 and 904 as depicted in FIG. 9.

At step 1006, using or more computers, a third set of information is obtained, including: for each of multiple publishers, one or more audience segment profile templates; for at least one advertiser or proxy of an advertiser, one or more target customer profile templates; and, one or more matching program templates for use in matching one or more audience segment profile templates with one or more target customer profile templates.

At step 1008, using one or more computers, based at least in part on the first, the second, and the third sets of information, a simulation is generated and stored, relating to an outcome of at least a portion of the advertising campaign, including utilizing at least one of the one or more matching program templates to match at least one of the one or more audience segment profile templates with at least one of the one or more target customer profile templates.

At step 1010, using one or more computers, an advertiser or a publisher is provided with an option to make a single selection to cause implementation of all or a portion of the advertising campaign.

Figure 11:
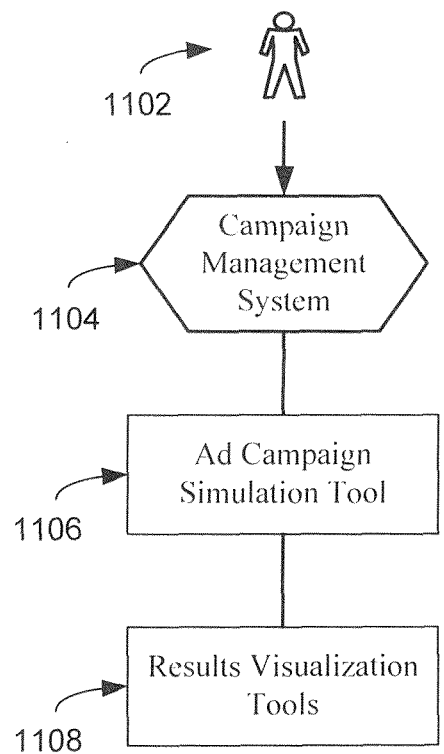
FIG. 11 is a block diagram illustrating one embodiment of the invention.

FIG. 11 is a block diagram 1100 illustrating one embodiment of the invention. An advertiser or publisher 1102 is depicted, utilizing an advertising campaign management system 1104 according to an embodiment of the invention.

Block 1106 represents an advertising campaign simulation tool according to an embodiment of the invention, which may be part of the advertising campaign management system 1104.

Block 1108 represents a set of results visualization tools. The tools can be used by the advertiser or publisher, or one or more other parties, to construct, view and analyze hypothetical results or outcomes of simulated advertising campaigns, or portions thereof. Of course, many additional elements and components may also be included.

Figure 12:
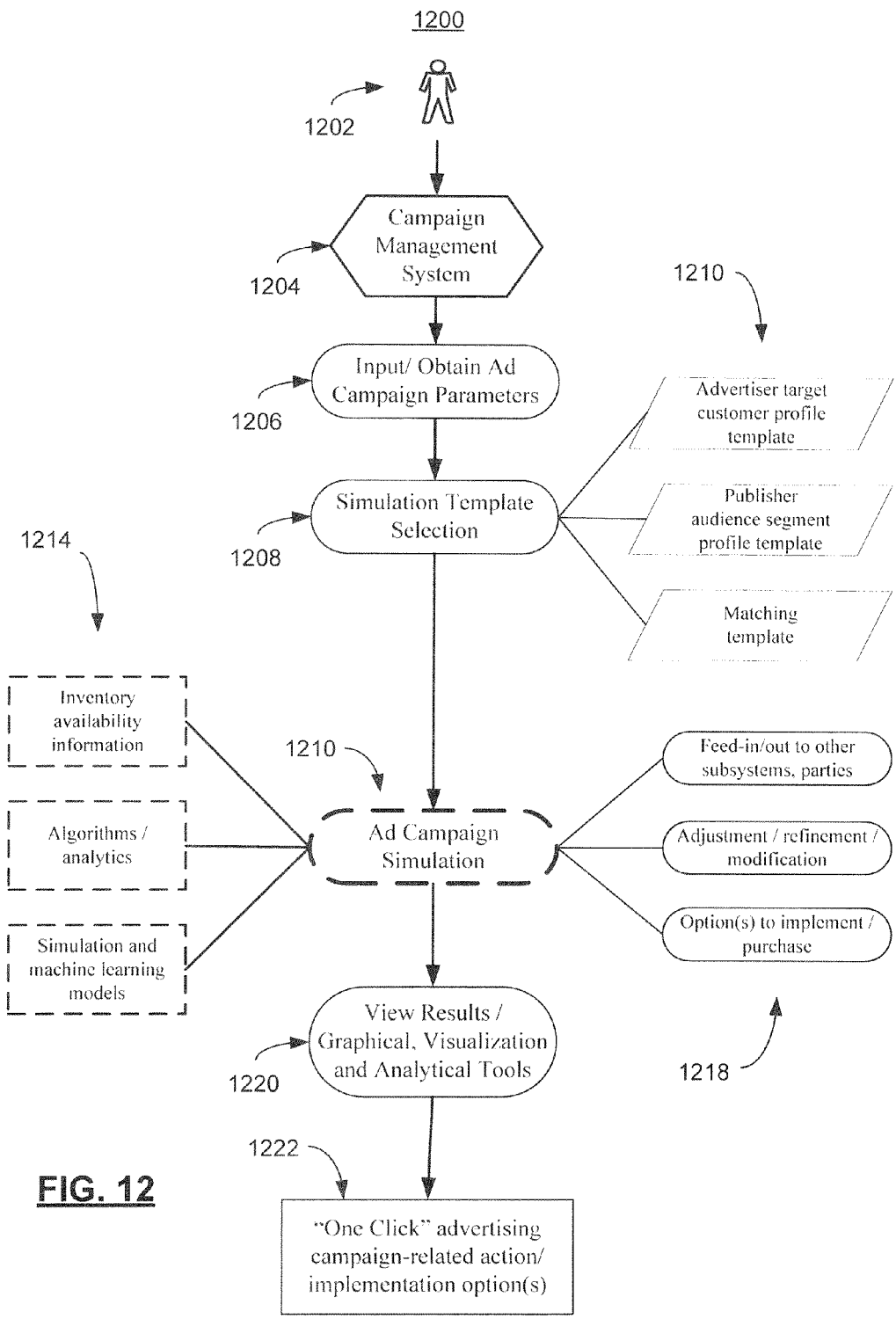
FIG. 12 is a block diagram illustrating one embodiment of the invention.

FIG. 12 is a block diagram 1200 illustrating one embodiment of the invention. An advertiser or publisher 1202 is depicted, utilizing an advertising campaign management system 1204 according to an embodiment of the invention.

Block 1206 represents input or obtaining of advertising campaign or associated parameters, which can include campaign objective information, among other things.

Block 1208 represents selection of templates to be used in a simulation, such as by the advertiser or publisher 1202. A set of selected templates 1210 can include an advertiser target customer profile template, a publisher audience segment profile template, and a matching template. In some embodiments, the templates are specifically or exclusively designated or utilized simulation the plates, while in other embodiments, they are not.

Block 1210 represents advertising campaign situation, which can include running or implementation of one or more advertising campaign simulations. Various tools, software, algorithms, information, etc., can be used in this regard, including, as represented by blocks 1214, among other things, actual, estimated or projected inventory availability information, algorithms and analytics, and simulation and machine learning models.

As represented by blocks 1218, results or information from simulations can be used as a feed-in or feed-out to other advertising campaign management subsystems, other systems entirely, or other entities or parties. Furthermore, adjustment, refinement and modification functionality or features may be utilized or provided. Still further, functionality may be provided to allow an advertiser to make purchases or implementations relating to advertising campaigns, such as through or in connection with simulations.

Block 1220 represents viewing, such as of displays, associated with simulation results or outcomes, which can include use of a variety of graphical, visualization and analytical tools, among other things.

Step 1222 represents "One Click" advertising campaign-related action/implementation option(s), which may be made available to the advertiser in some embodiments of the invention. Various details are possibilities relating to this are discussed herein, including with regard to FIG. 8, among other places.

Some embodiments of the invention provide, for example, a system that enables an advertiser to self-serve, control, and perform computer advertising campaign simulations, such as by using, or modifying and using, an advertiser's ideal, high definition customer profile and an online/offline publisher's high definition audience segment profile. In some embodiments, methods are provided that enable an advertiser to define and create N number of high definition target customer profile templates, methods that enable an advertiser to select and or modify a publisher's high definition audience segment profile template from a library of such, and methods that enable the advertiser to select and or modify a matching program, such as a publisher's matching program, from a library of publisher's matching programs. Methods are provided that include analytics utilized, for example, to compute a match between an advertiser's high definition target customer profile to a publisher's high definition audience segment profile. Furthermore, methods are provided to execute scenario-based simulations, using, for example, techniques such as Monte Carlo simulations or other simulation techniques, in order to model and predict the outcome of N number of advertiser campaigns, for example. Moreover, in some embodiments, a system is provided that enable, the advertiser to have an advertising campaign laboratory, to explore and experiment with different types of campaign options, and to test a variety of campaign possibilities and see the possible campaign results before spending any advertising campaign money. Techniques according to embodiments of the invention can increase an advertiser's revenue, such as by leading to better advertising campaign performance, such as higher conversion rates or increased advertising campaign return on investment. Techniques are provided that increase advertiser end-to-end advertising campaign control, and that reduce advertising campaign expenditures, such as on campaigns targeting the incorrect or non-optimized audiences.

One advertiser or Chief Marketing Officer ideal goal can be to create and test advertising campaign effectiveness before spending campaign dollars. Testing campaigns can help minimize the advertising campaign misalignment between customer profiles and target audience profiles, for example. Better alignment can increase an advertiser's revenue, increase advertising campaign return on investment, and reduces advertising campaign expenses on campaigns targeting the incorrect audiences, as the alignment gap decreases. Some embodiments of the invention provide a system that helps close the alignment gap between advertisers' ideal target customers and online/offline publishers' audiences, such as by executing models, simulating advertising campaigns, and allowing advertisers and publishers to gain projected end-result campaign insights before spending money.

Some embodiments provide an advertiser with a portal into all online and offline advertising channels and inventory. The advertiser can use this data as inputs to their campaign simulations models. This can help prevent marketers from wasting time creating campaign models and simulations with online and offline options that do not exist, for example.

Some embodiments include utilizing or providing advertisers with real prices. Advertisers can use this real data as inputs to their campaign simulation models. This can allow easier and faster modeling and simulating of pricing scenarios for an entire campaign, regardless of the number of online and offline advertising channels that support an overarching campaign simulation. As such, this can provide more realistic campaign cost estimates using real prices.

Some embodiments provide advertisers with the ability to create, templatize, store and retrieve global advertising campaign simulations, such as in a library of such. This can allow easier and faster creation of new and derivative scenarios, which can encourage marketeers to explore and experiment without spending money.

Some embodiments provide advertisers with the ability to integrate input variables or information from their own customer databases into their simulation templates, which can sharpen and focus advertising campaign simulations.

Some embodiments provide advertisers with the ability to incorporate input variables or information, such as from their advertising agencies, third party partners (e.g. Nielsen), and other value-chain third party service providers, into their simulation templates.

Some embodiments provide advertisers with the ability to incorporate algorithms and analytics into their simulation templates, which can include utilizing machine learning techniques to improve simulations.

Some embodiments provide an advertiser with the ability to look at a publishers library of simulation templates to better view, control, and test advertising campaign simulations. This can help provide an advertiser with a variety of simulations to help the advertiser quickly learn how to use the system and to guide the advertiser with campaign simulations that are successful.

Some embodiments provide an advertiser with a search and recommendation engine to, for example, find simulation segments in the publisher's simulation segment library. This can include providing the advertiser with the ability to search and quickly identify the most relevant simulation models and methodologies.

Some embodiments include allowing an advertiser to create or modify publisher simulation templates, which can enable the advertiser to fine tune, optimize, and better align the advertisers simulations.

Some embodiments enable an advertiser to launch N number of campaign simulations without having to know various math techniques and statistics. This can encourage marketeers of all levels of knowledge and experience to explore and experiment with campaign simulations, providing an easy tool for non-math users, while also providing a powerful tool for PhDs to build and incorporate their own simulation models or algorithms, for example.

Some embodiments enable publishers to create global/scalable simulations for all ecosystem players, increasing publisher revenue by providing a global advertising campaign simulation service.

Some embodiments enable a publisher to connect all of the online and offline advertisers to make it easier for advertisers to one-stop simulate advertising global campaigns. This can increase publisher revenue by making it easier and faster to "try before you buy"/"test drive", and can further encourage marketeers spend every advertising campaign dollar in their budget.

Some embodiments enable publishers to create sophisticated, analytics-driven campaign simulation options for advertisers, which can include recommendation systems and services, and could incorporate social network, social network connections or social networking services or Web sites. For example, a recommendation can be provided such as, "People who created this campaign simulation also purchased this audience segment". This can increase publisher revenue by providing new offers and next best offers, for example.

Some embodiments provide systems and methods using software, databases, and modern communication methods to enable advertisers and publishers to model advertising campaign simulations. Modeling may be performed by incorporating inputs, such as an advertiser's ideal, high definition target customer profile and a publisher's online/offline high definition audience segment profile, and then performing simulations, such as Monte Carlo simulations, on these data sets to project, determine and observe potential campaign results.

In some embodiments, methods are provided that that enable an advertisers to define and create N number of simulations stored in simulation profile templates. Methods are provided that that enable an advertiser to select, or modify and select, a publisher's simulation profile from a library of N simulation profiles. Furthermore, methods are provided that enable the advertiser to create and upload their own simulation programs, and to incorporate input data from third party service providers, for example.

In some embodiments, a system is provided that creates an advertising campaign laboratory. The lab, for example, can enable the marketeer to explore and experiment with different types of campaign options, to simulate a variety of campaign possibilities, and to examine possible campaign results, such as before spending any advertising campaign money.

In various embodiments, the system can be used as a standalone system or can be used with upstream systems or advertising campaign management subsystems, or with third party ecosystem service providers.

In some embodiments, publisher can create sophisticated simulation templates, such as by industry, sub-industry, micro-industry, etc.

In some embodiments, an advertiser can significantly increase revenue and return on investment by simulating campaigns before actually buying campaigns that would turn out to be ineffective or low-performing.

Some embodiments allow advertisers and other parties to utilize and take advantage of granular information, while yet preserving a necessary degree of privacy and anonymity. For example, some embodiments enable advertisers to run simulations but not violate customer privacy and to avoid audience personal privacy information (PII) disclosure. For example, in some embodiments, advertiser customer data or publisher audience data, which the advertiser or the publisher may highly value as "crown jewels", stays behind a corporate firewall, while derived information is nonetheless well-utilized.

Some embodiments provide a global system to accurately simulate global online and offline campaigns. Systems are provided that incorporate various ecosystem data sources when executing a campaign simulation, in order to accurately model and predict outcomes.

Some embodiments provide systems that address European Union PII issues, which have been significantly more rigid than Unites States PII governance. According to some embodiments, simulations do not store any information that uniquely identifies a customer.

In some embodiments, a simulation can have N number of simulation variables and algorithms to provide increasingly refined and more accurate campaign simulations. In some embodiments, machine learning techniques are incorporated, such to allow the system to learn over time, which can include using, for example, stored and updated algorithms from a library of such.

While the invention is described with reference to the above drawings, the drawings are intended to be illustrative, and the invention contemplates other embodiments within the spirit of the invention.

The invention claimed is:

1. A method comprising:
obtaining a first set of information comprising statistical information relating to advertisement campaign performance for multiple online and offline advertising channels;
obtaining, from an advertiser or a proxy of an advertiser, a set of one or more objectives relating to an advertising campaign, including key performance indicators (KPIs) and goals of the advertising campaign;
providing at least one visualization tool, configured to display one or more simulated models and configured to receive and display input including campaign variables, KPIs, and at least the set of one or more objectives and modify existing campaign simulation templates;
obtaining, by the one or more processors, one or more campaign simulation templates from a library of publisher templates comprising one or more pre-defined records or fields for storing particular advertiser-associated information, wherein the one or more campaign simulation templates include simulation by industry, sub-industry, or micro-industry; and
based at least in part on the first set of information, the one or more campaign simulation templates, the set of one or more objectives, and input provided by the advertiser or the proxy of the advertiser through at least one graphical user interface of the visualization tool, generating, displaying and storing, a set of allocation recommendations relating to the advertising campaign, wherein the set includes competitive recommendations for additional selections of resource allocations based on similarity to the advertising campaign and tailored to meet the advertiser KPIs and goals of the advertising campaign, when the advertiser or the proxy of the advertiser enables application of analytic competitive recommendations, wherein the similarity to the advertising campaign is determined based on similarity to simulation by industry, sub-industry, or micro-industry, advertising business type, segment and audience targeting, wherein the competitive recommendations include suggestions related to advertising budget or spend allocation for a particular online property or offline channel selection of a particular businesses targeting a particular segment or audience.

2. The method of claim 1, comprising allowing the advertiser or the proxy of the advertiser to choose to comprehensively implement all or part of the set of allocation recommendations.

3. The method of claim 1, wherein the set of allocation recommendations include optimized proportioning of budget or spend across multiple online advertising channels and multiple offline advertising channels.

4. The method of claim 1, comprising implementing the set of allocation recommendations on behalf of the advertiser or proxy of the advertiser.

5. The method of claim 1, comprising implementing the set of allocation recommendations on behalf of the advertiser or proxy of the advertiser in an optimized fashion, including implementing online and offline advertising purchases on behalf of the advertiser or the proxy of the advertiser across multiple online advertising channels and multiple offline advertising channels.

6. The method of claim 1, further comprising;
managing the advertising campaign over a predetermined period of time;
storing newly available information over the predetermined period of time; and
modifying and updating the set of allocations recommendations based on the newly available information.

7. The method of claim 1, wherein the first set of information comprises advertising-related inventory availability information relating to each of the multiple online and offline advertising channels.

8. The method of claim 1, comprising providing or utilizing one or more simulation models in allowing the advertiser or the proxy of the advertiser to run advertising resource allocation hypotheticals and view simulation results.

9. The method of claim 1, comprising utilizing one or more machine learning models.

10. The method of claim 1, wherein the advertising campaign comprises multiple advertising campaigns, wherein each of the multiple advertising campaigns is part of the advertising campaign.

11. A system comprising:
one or more server computers coupled to a network; and
one or more databases coupled to the one or more server computers;

wherein the one or more server computers are for:
obtaining a first set of information comprising statistical information relating to advertisement campaign performance for multiple online and offline advertising channels;
obtaining, from an advertiser or a proxy of an advertiser, a set of one or more objectives relating to an advertising campaign, including key performance indicators (KPIs) and goals of the advertising campaign;
providing at least one visualization tool, configured to display one or more simulated models and configured to receive and display input including campaign variables, KPIs, and at least the set of one or more objectives and modify existing campaign simulation templates;
obtaining, by the one or more processors, one or more campaign simulation templates from a library of publisher templates comprising one or more pre-defined records or fields for storing particular advertiser-associated information, wherein the one or more campaign simulation templates include simulation by industry, sub-industry, or micro-industry; and
based at least in part on first set of information, the one or more campaign simulation templates, the set of one or more objectives, and input provided by the advertiser or the proxy of the advertiser through at least one graphical user interface of the visualization tool, generating, displaying and storing, a set of allocation recommendations relating to the advertising campaign, wherein the set includes competitive recommendations for additional selections of resource allocations based on similarity to the advertising campaign and tailored to meet the advertiser KPIs and goals of the advertising campaign, when the advertiser or the proxy of the advertiser enables application of analytic competitive recommendations, wherein the similarity to the advertising campaign is determined based on similarity to simulation by industry, sub-industry, or micro-industry, advertising business type, segment and audience targeting, wherein the competitive recommendations include suggestions related to advertising budget or spend allocation for a particular online property or offline channel selection of a particular businesses targeting a particular segment or audience.

12. The system of claim 11, comprising allowing the advertiser or the proxy of the advertiser to choose to comprehensively implement all or part of the set of allocation recommendations.

13. The system of claim 11, wherein the set of allocation recommendations include optimized proportioning of budget or spend across multiple online advertising channels and multiple offline advertising channels.

14. A non-transitory computer readable medium or media containing instructions for executing a method comprising:
obtaining a first set of information comprising statistical information relating to advertisement campaign performance for multiple online and offline advertising channels;
obtaining, from an advertiser or a proxy of an advertiser, a set of one or more objectives relating to an advertising campaign, including key performance indicators (KPIs) and goals of the advertising campaign;
providing at least one visualization tool configured to display one or more simulated models and configured to receive and display input including campaign variables, KPIs, and at least the set of one or more objectives and modify existing campaign simulation templates;
obtaining, by the one or more processors, one or more campaign simulation templates from a library of publisher templates comprising one or more pre-defined records or fields for storing particular advertiser-associated information, wherein the one or more campaign simulation templates include simulation by industry, sub-industry, or micro-industry;
based at least in part on the first set of information, the one or more campaign simulation templates, and the set of one or more objectives, generating, displaying and storing, a set of allocation recommendations relating to the advertising campaign, wherein the set includes competitive recommendations for additional selections of resource allocations based on similarity to the advertising campaign and tailored to meet the advertiser KPIs and goals of the advertising campaign, when the advertiser or the proxy of the advertiser enables application of analytic competitive recommendations, wherein the similarity to the advertising campaign is determined based on similarity to simulation by industry, sub-industry, or micro-industry, advertising business type, segment and audience targeting, wherein the competitive recommendations include suggestions related to advertising budget or spend allocation for a particular online property or offline channel selection of a particular businesses targeting a particular segment or audience,
and optimized proportioning of budget or spend across multiple online advertising channels and multiple offline advertising channels; and
allowing the advertiser or the proxy of the advertiser to make a single selection through at least one graphical user interface of the visualization tool to choose to comprehensively implement all or part of the set of allocation recommendations.

15. The method of claim 1, further comprising receiving input from the advertiser or the proxy of the advertiser through the at least one graphical user interface of the visualization tool.

16. The method of claim 15, further comprising visually integrating the received input into the one or more simulated models.

17. The method of claim 1, wherein the input provided by the advertiser or the proxy of the advertiser includes at least one variable from data stored in a customer database of the advertiser, an advertising agency of the advertiser, and a third party data provider.

18. The method of claim 1, wherein the competitive recommendations include segment, audience, property and channel recommendations of businesses with similar targeting actions.

19. The method of claim 1, wherein the visual summary analytics include real time heat maps configured to track successful campaigns with similar targeting actions.

20. The method of claim 1, wherein the one or more visualization displays is configured to provide visual summary analytics, competitive recommendations based on similarity to the advertising campaign, and granular graphical information relating to assessment of the advertising campaign.

* * * * *